(12) United States Patent
Lee (10) Patent No.: US 11,110,808 B2
(45) Date of Patent: Sep. 7, 2021

(54) THERMAL MANAGEMENT SYSTEM FOR VEHICLE

(71) Applicant: HANON SYSTEMS, Daejeon (KR)

(72) Inventor: Hae Jun Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 35 days.

(21) Appl. No.: 16/323,562

(22) PCT Filed: Nov. 21, 2017

(86) PCT No.: PCT/KR2017/013241
§ 371 (c)(1),
(2) Date: Feb. 6, 2019

(87) PCT Pub. No.: WO2018/105927
PCT Pub. Date: Jun. 14, 2018

(65) Prior Publication Data
US 2019/0168569 A1    Jun. 6, 2019

(30) Foreign Application Priority Data

Dec. 7, 2016 (KR) .......................... 10-2016-0166017

(51) Int. Cl.
*B60L 50/60* (2019.01)
*B60H 1/00* (2006.01)
(Continued)

(52) U.S. Cl.
CPC .............. *B60L 50/60* (2019.02); *B60H 1/00* (2013.01); *B60H 1/00278* (2013.01);
(Continued)

(58) Field of Classification Search
CPC ............ B60H 1/00807; B60H 1/00885; B60H 1/143; B60H 1/2221; B60H 1/200278;
(Continued)

(56) References Cited

U.S. PATENT DOCUMENTS 7,841,431 B2    11/2010  Zhou
9,701,215 B1 *  7/2017  Kim ...................... B60L 58/27
(Continued)

FOREIGN PATENT DOCUMENTS

JP         5831108 B2    12/2015
KR      101283592 B1     7/2013
(Continued)

OTHER PUBLICATIONS

International Search Report and Written Opinion dated Mar. 8, 2018 from corresponding International Patent Application No. PCT/KR2017/013241 with English translation of International Search Report.

*Primary Examiner* — Larry L Furdge
(74) *Attorney, Agent, or Firm* — Dickinson Wright PLLC (57) ABSTRACT

A vehicle thermal management system for thermally managing electronic components for an autonomous vehicle. The thermal management system includes a refrigerant line, a compressor which sucks in and compresses a refrigerant and then discharges the refrigerant in a high-temperature, high-pressure, gaseous state, a condenser for condensing the refrigerant by subjecting the refrigerant to heat exchange with air, a first expansion valve for expanding the refrigerant, and an evaporator which is provided inside an air-conditioning case and subjects the refrigerant to heat exchange with the air being discharged into a vehicle interior for air-conditioning the vehicle interior. A cooling system of the electronic components required for autonomous driving of the vehicle is connected to a branched refrigerant line branched from the refrigerant line.

8 Claims, 8 Drawing Sheets

(51) Int. Cl.
*B60H 1/14* (2006.01)
*B60H 1/22* (2006.01)
*B60K 11/02* (2006.01)
*B60L 58/26* (2019.01)

(52) U.S. Cl.
CPC .......... *B60H 1/00385* (2013.01); *B60H 1/14* (2013.01); *B60H 1/22* (2013.01); *B60K 11/02* (2013.01); *B60L 58/26* (2019.02); *B60H 2001/00307* (2013.01); *B60L 2240/34* (2013.01); *B60L 2240/36* (2013.01); *Y02T 10/70* (2013.01)

(58) Field of Classification Search
CPC ...... B60H 1/00385; B60H 2001/00307; B60Y 2200/91; B60Y 2306/05; B60L 58/26; B60L 2240/34; B60L 2240/36
See application file for complete search history.

(56) References Cited

U.S. PATENT DOCUMENTS

| | | | |
|---|---|---|---|
| 10,259,286 B2* | 4/2019 | Janier | B60K 11/02 |
| 2012/0225341 A1* | 9/2012 | Major | B60H 1/143 |
| | | | 429/120 |
| 2015/0217622 A1* | 8/2015 | Enomoto | B60L 1/003 |
| | | | 165/42 |
| 2016/0107508 A1* | 4/2016 | Johnston | B60H 1/00278 |
| | | | 165/202 |
| 2017/0297408 A1* | 10/2017 | Kim | B60H 1/00899 |

FOREIGN PATENT DOCUMENTS

| | | |
|---|---|---|
| KR | 20140106788 A | 9/2014 |
| KR | 20140147365 A | 12/2014 |
| KR | 101646445 B1 | 8/2016 |

\* cited by examiner

THERMAL MANAGEMENT SYSTEM FOR VEHICLE

CROSS-REFERENCE TO RELATED APPLICATIONS

This application is a U.S. National Stage of International Application No. PCT/KR2017/013241, filed Nov. 21, 2017, which claims the benefit and priority of KR 10-2016-0166017 filed Dec. 7, 2016. The entire disclosures of each of the above applications are incorporated herein by reference.

TECHNICAL FIELD

The present invention relates to a thermal management system for a vehicle, and more particularly, to a thermal management system for a vehicle capable of cooling or heating electronic devices for an autonomous system.

BACKGROUND ART

In general, an autonomous system for a vehicle includes electronic devices, such as a lidar, a radar, a sensor, and so on. For autonomous driving of the vehicle, a series of thermal managements for cooling or heating electric parts including the electronic devices are essentially demanded.

In the meantime, U.S. Pat. No. 7,841,431 (Nov. 30, 2010) discloses a thermal management system for a vehicle including power train cooling subsystem, a refrigeration subsystem, a battery cooling subsystem, and a heating, ventilation and cooling (HVAC) subsystem.

A conventional thermal management system for a vehicle includes a cooling subsystem, an HVAC subsystem having a first refrigerant loop having a heating means and a cooling means, a power train cooling subsystem having a second refrigerant loop having a radiator, and a means for connecting the first refrigerant loop and the second refrigerant loop with each other to control them.

Refrigerant flows in the first refrigerant loop, and an electro-compressor, a condenser, an expansion valve, and a chiller are disposed on the first refrigerant loop in a flow direction of the refrigerant in order. The electro-compressor inhales and compresses the refrigerant, and then, discharges out in a gaseous state of high temperature and high pressure. The condenser exchanges heat between the refrigerant and the air blown from a blower. The expansion valve is arranged between the condenser and the chiller to expand the refrigerant. The chiller exchanges heat between refrigerant of low temperature and low pressure expanded in the expansion valve and coolant of a coolant line.

Moreover, coolant flows inside the second refrigerant loop, and the second refrigerant loop cools or heats a power transmission means, such as a motor. The coolant circulated and induced after being heat-exchanged with the motor flows toward a heat storing unit after passing a low temperature radiator (LTR) or flows toward the heat storing unit after being heat-exchanged with the refrigerant to be cooled while passing the chiller. The coolant line has a water pump for circulating the coolant.

When the conventional thermal management system breaks down, it cannot cool a heat source unit stably and continuously, and it may make autonomous driving impossible in case that the thermal management system is applied to an autonomous vehicle. In the worst case, it causes a breakdown in autonomous driving to cause an accident.

Furthermore, the conventional thermal management system may have a problem in applicability since requiring a package space occupying a large portion of the vehicle. Additionally, the conventional thermal management system may have a problem in that the size of the blower increases if a great deal of cooling performance is required in a small-sized space.

In addition, the conventional thermal management system has another problem in that the air to be discharged out flows back into an intake port since just one module inhales outdoor air and discharges the air with elevated temperature to the outside. So, the conventional thermal management system is deteriorated in cooling performance and efficiency. In order to solve the problems, the thermal management system requires an air duct, but it causes another problem due to design constraints in a vehicle installation package.

DISCLOSURE

Technical Problem

Accordingly, the present invention has been made in view of the above-mentioned problems occurring in the prior art, and it is an object of the present invention to provide a thermal management system for a vehicle capable of effectively performing thermal management of electronic components of an autonomous vehicle using a refrigerant cycle, which performs air conditioning of the interior of the vehicle.

Technical Solution

To accomplish the above object, according to the present invention, there is provided a thermal management system for a vehicle including a refrigerant cycle for carrying out air-conditioning of the interior of the vehicle, wherein a compressor for inhaling and compressing refrigerant and discharging the refrigerant in a gaseous state of high temperature and high pressure, a condenser for condensing the refrigerant by exchanging heat with the air, a first expansion valve for expanding the refrigerant, and an evaporator disposed inside an air-conditioning case to exchange heat between the refrigerant and the air discharged to the interior of the vehicle are disposed in a refrigerant line, which is a flow passage of the refrigerant. A cooling system of electronic components required for autonomous driving of the vehicle is connected to a refrigerant branch line branching off from the refrigerant line.

Moreover, the thermal management system includes: a chiller for exchanging heat between the refrigerant and coolant exchanging heat with the electronic components; and a first coolant line, which is a flow passage of the coolant exchanged heat with the electronic components and passes the chiller.

Furthermore, the refrigerant branch line branches off from the refrigerant line at the upstream side of the first expansion valve and is connected to the refrigerant line at the downstream side of the evaporator, and a second expansion valve for expanding the refrigerant is disposed in the refrigerant branch line at the upstream side of the chiller so that the chiller is arranged in parallel with the evaporator.

Additionally, the thermal management system includes: a second coolant line branching off from the first coolant line at the upstream side of the chiller and bypassing the chiller; a low-temperature radiator disposed in the second coolant line to exchange heat between the coolant and the air; and a first valve for making the coolant selectively flow toward the chiller and the low-temperature radiator.

In addition, the low-temperature radiator is arranged side by side with the condenser at the front of the vehicle.

Moreover, the thermal management system further includes a third coolant line branching off from the second coolant line at the downstream side of the low-temperature radiator and connected to the upstream side of the low-temperature radiator, wherein the third coolant line passes a vehicle power heat source part.

Furthermore, the thermal management system further includes a second valve disposed at a branch point between the second coolant line and the third coolant line to make the coolant selectively flow toward the vehicle power heat source part and the first coolant line.

Additionally, the thermal management system further includes a heater disposed in the first coolant line to heat the coolant.

In addition, the thermal management system further includes a coolant temperature sensor disposed in the first coolant line to sense temperature of the coolant, wherein the coolant temperature sensor is arranged at the upstream side of the electronic components.

Moreover, the first coolant line is formed to pass a battery, and the battery is arranged in series with the electronic components.

Furthermore, the thermal management system further includes a first water pump and a second water pump disposed in the first coolant line to circulate the coolant, wherein the first water pump is arranged to be adjacent to the electronic components, and the second water pump is arranged to be adjacent to the battery.

Additionally, the thermal management system further includes a coolant branch line branching off from the first coolant line at the upstream side of the electronic components and bypassing the electronic components, wherein the coolant branch line is formed to pass the battery of the vehicle.

Moreover, the thermal management system further includes a third valve disposed at a branch point between the first coolant line and the coolant branch line to make the coolant selectively flow toward the electronic components and the battery.

In addition, the thermal management system further includes a heater disposed in the first coolant line to heat the coolant, wherein a branch point between the first coolant line and the coolant branch line is formed at the downstream side of the heater.

Advantageous Effects

As described above, the thermal management system for a vehicle according to the present invention can stably cool high heat of the autonomous system, which makes much of safety, so as to continue a smoothly autonomous running, construct a cooling system at a small cost utilizing an existing refrigerant cycle of a vehicle, and selectively supply heat sources for cooling and temperature rising to the electronic components and the battery of the autonomous system so as to optimize thermal management.

MODE FOR INVENTION

Hereinafter, a technical structure of a thermal management system for a vehicle according to the present invention will be described in detail with reference to the accompanying drawings.

Figure 1:
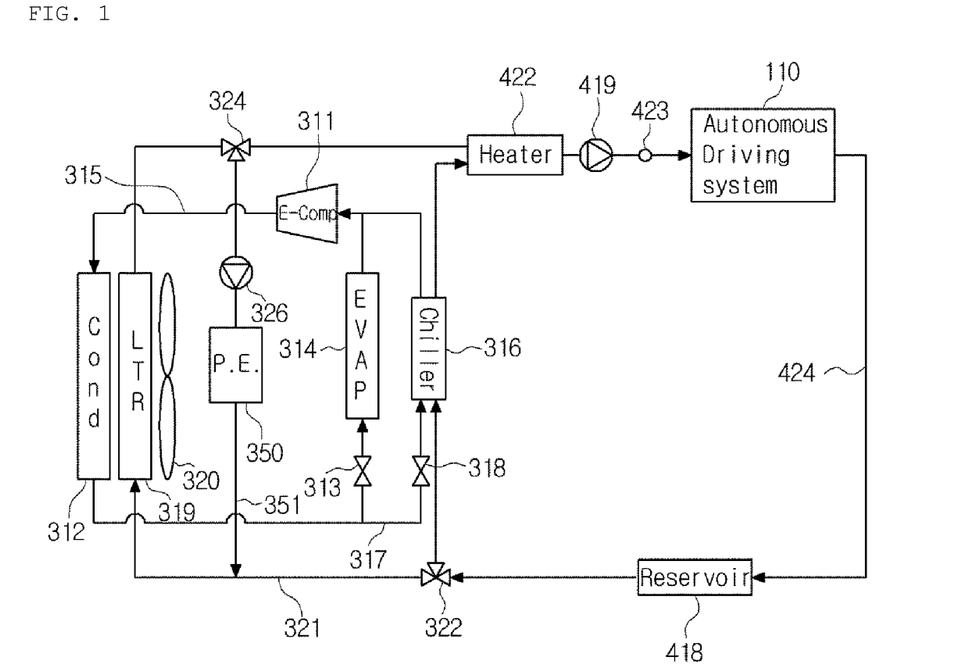
FIG. 1 is a view of a thermal management system for a vehicle according to a first preferred embodiment of the present invention.

FIG. 1 is a view of a thermal management system for a vehicle according to a first preferred embodiment of the present invention.

As shown in FIG. 1, the thermal management system for the vehicle according to the first preferred embodiment of the present invention is to perform a series of thermal managements to cool or heat electronic components (electronic devices 110), such as a computer, a lidar, a radar, and a sensor of an autonomous vehicle.

The thermal management system for the vehicle according to the first preferred embodiment of the present invention may be applied to an internal combustion engine (ICE) using an engine as a power source.

The thermal management system for the vehicle according to the first preferred embodiment of the present invention includes a refrigerant line 315 which is a flow passage of refrigerant, a compressor 311, a condenser 312 for condensing refrigerant by exchanging heat between the refrigerant and air, a first expansion valve 313 for expanding the refrigerant, and an evaporator 314. The compressor 311, the condenser 312, the first expansion valve 313, and the evaporator 314 are disposed in the refrigerant line 315 in order.

The compressor 311 inhales and compresses the refrigerant, and then, discharges out the refrigerant in a gaseous state of high temperature and high pressure. The condenser 312 exchanges heat between the air blown from a blower 320 and the refrigerant of high temperature and high pressure discharged from the compressor. The evaporator 314 is disposed inside an air-conditioning case, and makes the refrigerant, which is expanded into a low temperature and low pressure state after passing the first expansion valve 313, exchange heat with the air discharged to the interior of the vehicle.

Besides the evaporator, a heater core, a heating means such as a PTC heater, a temperature control door, a blowing means for inducing indoor air or outdoor air, and others may be disposed inside the air-conditioning case. The air induced into the inside of the air-conditioning case by the blowing means is cooled by the evaporator 314 or heated by the heater core to cool or heat the interior of the vehicle.

Moreover, the thermal management system for a vehicle further includes a refrigerant branch line 317, a chiller 316, a first coolant line 424, a second expansion valve 318, a second coolant line 321, a low-temperature radiator 319, a first valve 322, a third coolant line 351, and a second valve 324.

The refrigerant branch line 317 branches off from the refrigerant line 315. The refrigerant branch line 317 branches off from an upstream side refrigerant line 315 of the first expansion valve 313 and is connected to the downstream side of the evaporator 314. Some of the refrigerant passing through the condenser 312 flows toward the first expansion valve 313 and the evaporator 314, and the rest flows to the refrigerant branch line 317 and passes the second expansion valve 318 and the chiller 316.

The chiller 316 is disposed in the refrigerant branch line 317, and exchanges heat between the refrigerant and coolant exchanged heat with the electronic components 110 of the autonomous vehicle. The first coolant line 424 is a flow passage for the coolant exchanged heat with the electronic components 110, and passes through the chiller 316. The thermal management system according to the present invention further includes a second expansion valve 318 disposed in the refrigerant branch line 317 at the upstream side of the chiller 316 to expand the refrigerant. Finally, the chiller 316 is arranged in parallel with the evaporator 314.

The second coolant line 321 branches off from the first coolant line 424 at the upstream side of the chiller 316, is connected to the first coolant line 424 at the downstream side of the chiller 316, and bypasses the chiller 316. The second coolant line 321 passes the low-temperature radiator 319. The low-temperature radiator 319 is disposed in the second coolant line 321, and exchanges heat between the coolant and the air blown by a blower 320. The low-temperature radiator 319 may be arranged side by side with the condenser 312 at the front of the vehicle.

The first valve 322 makes the coolant selectively flow toward the chiller 316 and the low-temperature radiator 319. The first valve 322 is disposed at a branch point between the first coolant line 424 and the second coolant line 321, and may be in the form of a three-way valve.

The third coolant line 351 branches off from the second coolant line 321 at the downstream side of the low-temperature radiator 319, and is connected to the upstream side of the low-temperature radiator 319. The third coolant line 351 passes a vehicle power heat source part 350. The vehicle power heat source part 350 may be an engine. The coolant flowing in the third coolant line 351 recovers waste heat from the vehicle power heat source part 350, and radiates heat while passing the low-temperature radiator 319. A water pump 326 for circulating the coolant is disposed in the third coolant line 351.

In fact, the third coolant line 351 is a circuit for coolant to cool the engine in a general HVAC device, and is the same as a coolant loop circulating the engine, the radiator, and the engine. In this embodiment, a loop (first coolant line) for cooling the electronic components is connected to a coolant loop (third coolant line) for cooling the engine, so the existing low-temperature radiator can be utilized when the electronic components are cooled. In this instance, the second coolant line serves to connect the first coolant line and the third coolant line with each other.

The second valve 324 is disposed at a branch point between the second coolant line 321 and the third coolant line 351. The second valve 324 make the coolant selectively flow toward the vehicle power heat source part 350 and the first coolant line 424. That is, the coolant passing through the low-temperature radiator 319 flows toward the vehicle power heat source part 350, toward the first coolant line 424 by the second valve 324, or toward all of the vehicle power heat source part 350 and the first coolant line 424.

A heater 422 for heating the coolant is disposed in the first coolant line 424. The heater 422 may be an electric heater may be an electric heater operated by electricity or may be one of various forms. In this embodiment, cooling of the electronic components is mainly described, but electronic components require not only cooling but also temperature control for maintaining optimal temperature, preheating, and heating. The heater 422 raises temperature of the coolant to make temperature control of the electronic components possible.

Furthermore, the first coolant line 424 includes a heat reservoir 418 for storing a heat source for cooling or a heat source for heating, a first water pump 419 for circulating the coolant, and a coolant temperature sensor 423 for sensing temperature of the coolant. The coolant temperature sensor 423 is arranged at the upstream side of the electronic components 110. The coolant temperature sensor 423 senses temperature of the coolant at the front end of the electronic component 110 to supply coolant with proper temperature and may be utilized as a basis of decision to control rotational speed of the compressor and operation of the expansion valve.

Figure 2:
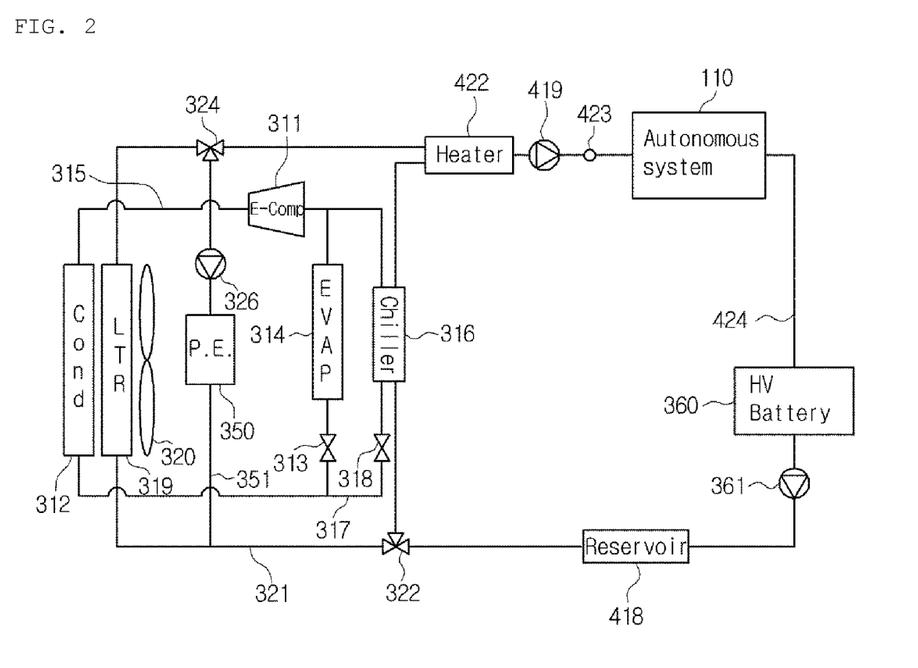
FIG. 2 is a view of a thermal management system for a vehicle according to a second preferred embodiment of the present invention.
Figure 3:
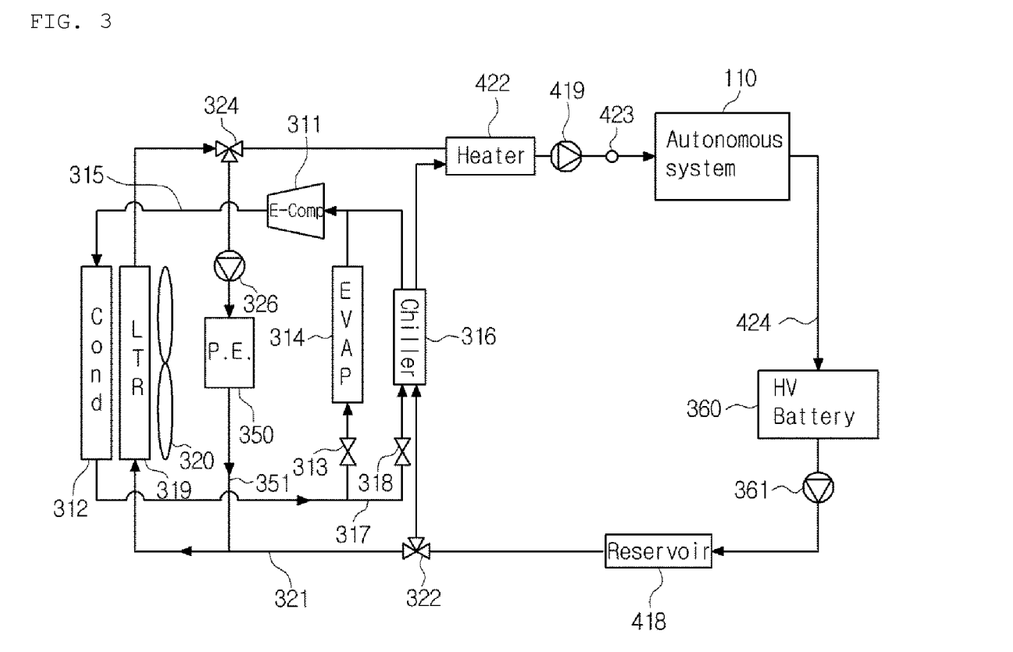
FIGS. 3 to 5 are views showing examples of operation of the thermal management system for the vehicle according to the second preferred embodiment of the present invention.
Figure 4:
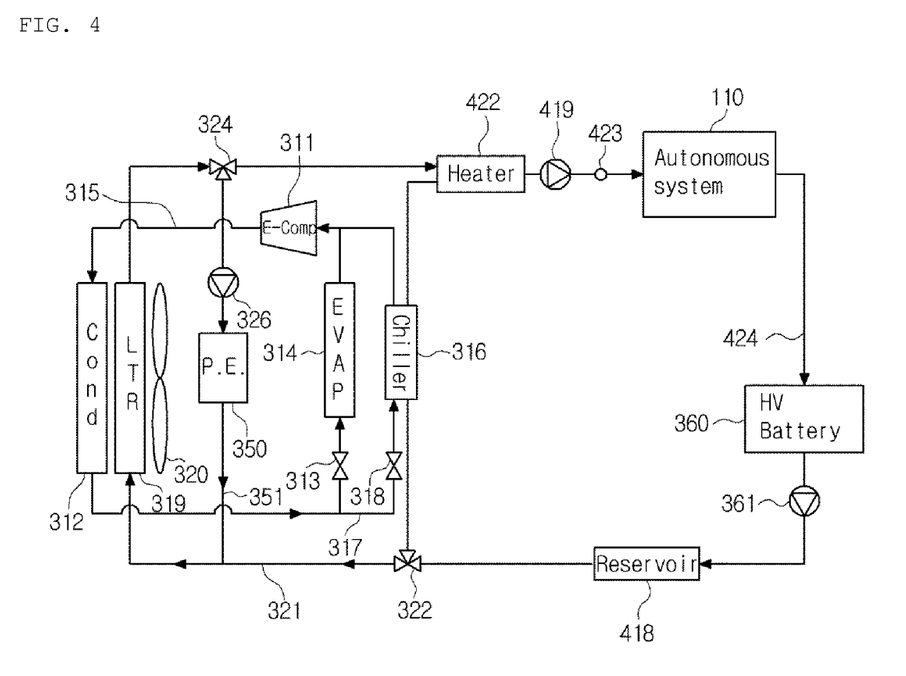
Figure 5:
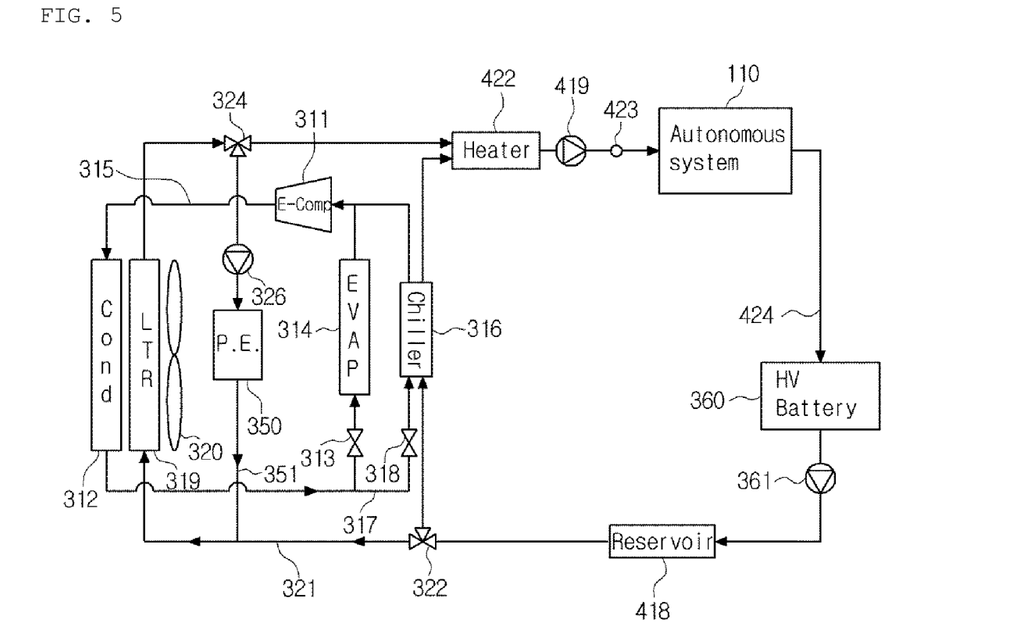

FIG. 2 is a view of a thermal management system for a vehicle according to a second preferred embodiment of the present invention, and FIGS. 3 to 5 are views showing examples of operation of the thermal management system for the vehicle according to the second preferred embodiment of the present invention.

As shown in FIGS. 2 to 5, the thermal management system for a vehicle according to the second preferred embodiment of the present invention may be applied to an electric vehicle, which uses a motor as a power source, a hybrid vehicle, which uses a motor and an engine as a power source, and a plug-in hybrid vehicle.

The thermal management system for a vehicle according to the second preferred embodiment of the present invention includes a refrigerant line 315 which is a flow passage of refrigerant, a compressor 311, a condenser 312 for condensing refrigerant by exchanging heat between the refrigerant and air, a first expansion valve 313 for expanding the refrigerant, and an evaporator 314. The compressor 311, the condenser 312, the first expansion valve 313, and the evaporator 314 are disposed in the refrigerant line 315 in order.

Moreover, the thermal management system for a vehicle further includes a refrigerant branch line 317, a chiller 316, a first coolant line 424, a second expansion valve 318, a second coolant line 321, a low-temperature radiator 319, a first valve 322, a third coolant line 351, and a second valve 324.

In description of the thermal management system according to the second preferred embodiment of the present invention, compared with the thermal management system according to the first preferred embodiment, description of the same parts will be omitted and different parts will be described.

In this embodiment, the vehicle power heat source part 350 may be a motor or an engine and the motor. Furthermore, the first coolant line 424 passes a battery 360 of the vehicle, and the battery 360 is arranged in series with the electronic components 110. In the electric vehicle, the hybrid vehicle, or the plug-in hybrid vehicle, the battery 360 is a hybrid battery for supplying energy necessary for driving the vehicle, and always requires cooling at a constant temperature.

The thermal management system for the vehicle uses the coolant flowed out of one chiller 414 to cool all of the electronic components 110 and the battery 360 of the autonomous vehicle. A first water pump 419 and a second water pump 361 are disposed in the first coolant line 424 to circulate the coolant. In this instance, the first water pump 419 is arranged to be adjacent to the electronic components 110, and the second water pump 361 is arranged to be adjacent to the battery 360.

As described above, because the electronic components 110 and the battery 360 of the autonomous vehicle are arranged in series, the structure of the coolant circuit becomes simplified, so that the thermal management system can be designed to be easily applied to a vehicle. Furthermore, the thermal management system for a vehicle according to the second preferred embodiment of the present invention can show stable operation, efficiency of the battery, and improved durability through the two water pumps, and continue cooling by circulating the minimum flow rate even if one among the water pumps breaks down.

Referring to the attached drawings, operation of the thermal management system for a vehicle according to the second preferred embodiment of the present invention will be described.

Referring to FIG. 3, in a first mode, the refrigerant discharged from the compressor 311 flows along the refrigerant line 315 while passing the condenser 312, the first expansion valve 313 and the evaporator 314 in order. In this instance, some of the refrigerant passing through the condenser 312 flows to the evaporator 314, and the rest flows to the chiller 316 along the refrigerant branch line 317 after passing the second expansion valve 318.

Additionally, the coolant recovering waste heat by passing the vehicle power heat source part 350 flows along the third coolant line 351, and then, flows to the second coolant line 321. After that, the coolant emits heat while passing through the low-temperature radiator 319, and flows to the third coolant line 351 by the second valve 324, and then, repeats the above-mentioned circulation.

In the meantime, the coolant recovering waste heat from the electronic components 110 passes the battery 360 arranged in series to recover waste heat of the battery 360, and passes the heat reservoir 418. After that, the coolant is cooled while passing through the chiller 316 by the first valve 322, and then, is repeatedly circulated to the electronic components 110.

Referring to FIG. 4, in a second mode, the refrigerant discharged from the compressor 311 flows along the refrigerant line 315 while passing the condenser 312, the first expansion valve 313 and the evaporator 314 in order. In this instance, some of the refrigerant passing through the condenser 312 flows to the evaporator 314, and the rest flows to the chiller 316 along the refrigerant branch line 317 after passing the second expansion valve 318.

Additionally, the coolant recovering waste heat by passing the vehicle power heat source part 350 flows along the third coolant line 351, and then, flows to the second coolant line 321. After that, the coolant emits heat while passing through the low-temperature radiator 319, and flows to the third coolant line 351 by the second valve 324, and then, repeats the above-mentioned circulation.

In the meantime, the coolant recovering waste heat from the electronic components 110 passes the battery 360 arranged in series to recover waste heat of the battery 360, and passes the heat reservoir 418. After that, the coolant is cooled by exchanging heat with the outdoor air while passing through the low-temperature radiator 319 along the second coolant line 321 by the first valve 322. The coolant passing through the low-temperature radiator 319 flows to the heater 422 again by the second valve 324, and circulates the electronic components 110 while flowing in the first coolant line 424.

Referring to FIG. 5, in a third mode, the refrigerant discharged from the compressor 311 flows along the refrigerant line 315 while passing the condenser 312, the first expansion valve 313 and the evaporator 314 in order. In this instance, some of the refrigerant passing through the condenser 312 flows to the evaporator 314, and the rest flows to the chiller 316 along the refrigerant branch line 317 after passing the second expansion valve 318.

Additionally, the coolant recovering waste heat by passing the vehicle power heat source part 350 flows along the third coolant line 351, and then, flows to the second coolant line 321. After that, the coolant emits heat while passing through the low-temperature radiator 319, and flows to the third coolant line 351 by the second valve 324, and then, repeats the above-mentioned circulation.

In the meantime, the coolant recovering waste heat from the electronic components 110 passes the battery 360 arranged in series to recover waste heat of the battery 360, and passes the heat reservoir 418. After that, some of the coolant is cooled while passing through the chiller 316 by the first valve 322, and then, repeatedly circulates the electronic components 110. The rest of the coolant is cooled by exchanging heat with the outdoor air while passing through the low-temperature radiator 319 along the second coolant line 321 by the first valve 322. The coolant passing through the low-temperature radiator 319 flows to the heater 422 again by the second valve 324, and circulates the electronic components 110 while flowing in the first coolant line 424.

Preferably, for cooling of the electronic components of the autonomous system, the low-temperature radiator is preferentially used (the second mode), and if temperature of the coolant does not reach target temperature, an effective operation is performed using the chiller (the first mode).

Figure 6:
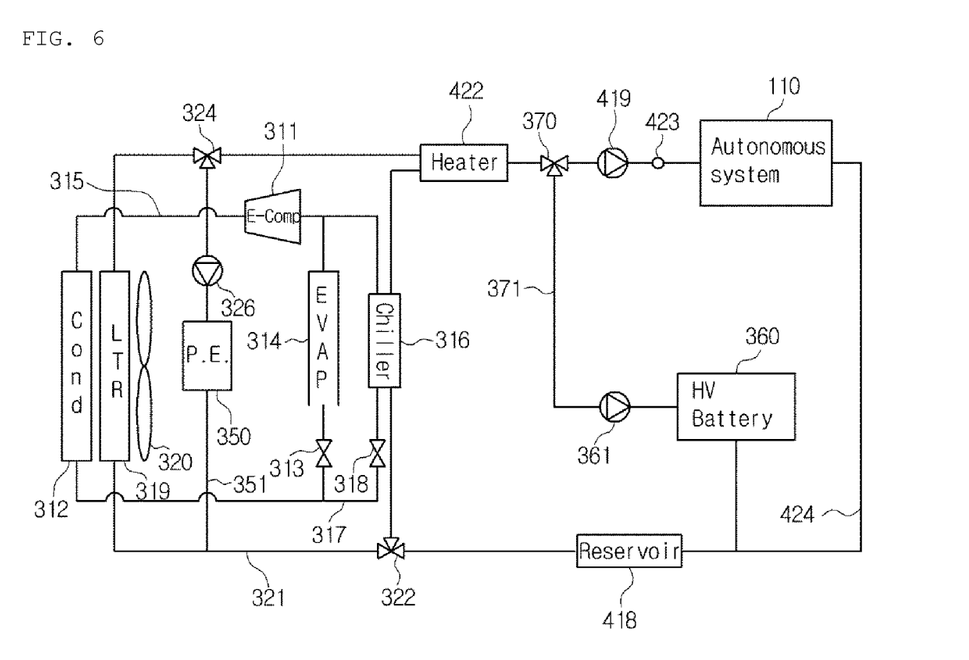
FIG. 6 is a view of a thermal management system for a vehicle according to a third preferred embodiment of the present invention.
Figure 7:
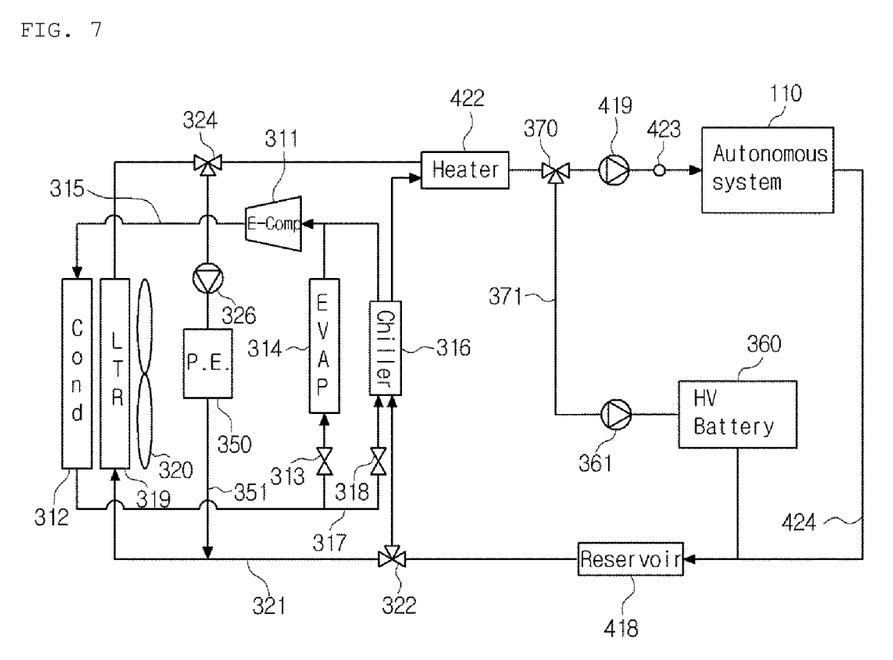
FIGS. 7 and 8 are views showing examples of operation of the thermal management system for the vehicle according to the third preferred embodiment of the present invention.
Figure 8:
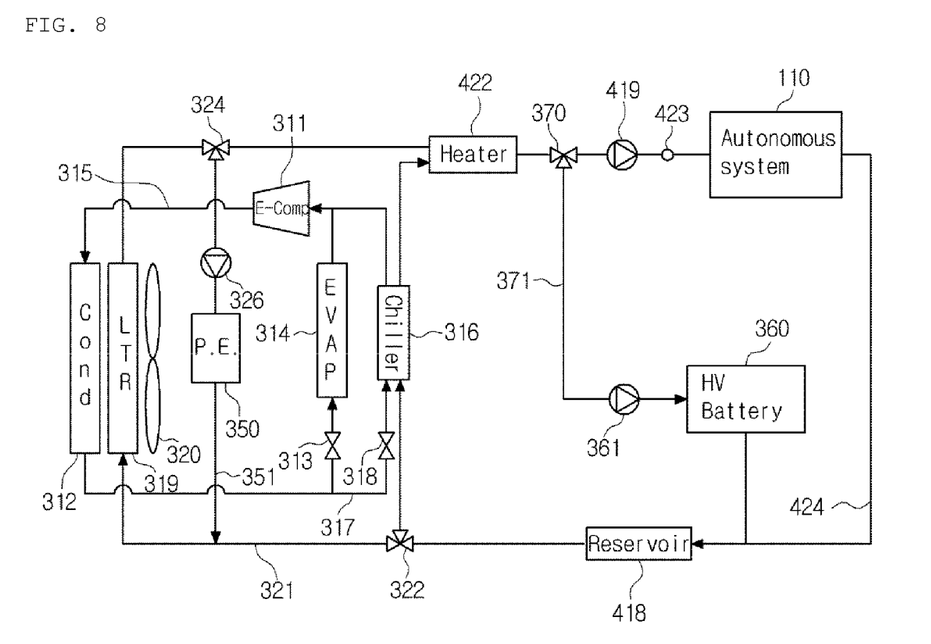

FIG. 6 is a view of a thermal management system for a vehicle according to a third preferred embodiment of the present invention, and FIGS. 7 and 8 are views showing examples of operation of the thermal management system for the vehicle according to the third preferred embodiment of the present invention.

Referring to FIGS. 6 to 8, the thermal management system for a vehicle according to the second preferred embodiment of the present invention may be applied to an electric vehicle, which uses a motor as a power source, a hybrid vehicle, which uses a motor and an engine as a power source, and a plug-in hybrid vehicle.

The thermal management system for a vehicle according to the second preferred embodiment of the present invention includes a refrigerant line 315 which is a flow passage of refrigerant, a compressor 311, a condenser 312 for condensing refrigerant by exchanging heat between the refrigerant and air, a first expansion valve 313 for expanding the refrigerant, and an evaporator 314. The compressor 311, the condenser 312, the first expansion valve 313, and the evaporator 314 are disposed in the refrigerant line 315 in order.

Moreover, the thermal management system for a vehicle further includes a refrigerant branch line 317, a chiller 316, a first coolant line 424, a second expansion valve 318, a second coolant line 321, a low-temperature radiator 319, a first valve 322, a third coolant line 351, and a second valve 324.

In description of the thermal management system according to the second preferred embodiment of the present invention, compared with the thermal management system according to the first preferred embodiment, description of the same parts will be omitted and different parts will be described.

In this embodiment, the vehicle power heat source part 350 may be a motor or an engine and the motor. The thermal management system for a vehicle further includes a coolant branch line 371 and a third valve 370. The coolant branch line 371 branches off from the first coolant line 424 at the upstream side of the electronic components 110, is connected to the downstream side of the electronic components 110, and bypasses the electronic components 110. The coolant branch line 371 passes the battery 360 of the vehicle.

The third valve 370 is disposed at a branch point between the first coolant line 424 and the coolant branch line 371. The third valve 370 makes the coolant selectively flow toward the electronic components 110 and the battery 360. A heater 422 for heating the coolant is disposed in the first coolant line 424. The branch point between the first coolant line 424 and the coolant branch line 371 is formed at the downstream side of the heater 422. Finally, the electronic components 110 and the battery 360 are arranged in parallel.

Furthermore, a first water pump 419 for circulating the coolant is disposed in the first coolant line 424, and a second water pump 361 for circulating the coolant is disposed in the coolant branch line 371.

The coolant passing through the heater 422 flows toward the electronic components 110 by the third valve 370 as shown in FIG. 8, or flows toward the battery 360 by the third valve 370 as shown in FIG. 9. Alternatively, the coolant passing through the heater 422 may flow toward all of the electronic components 110 and the battery 360 by the third valve 370.

Additionally, since the third valve 370 is arranged at the downstream side of the heater 422, when the electronic components 110 and the battery 360 of the autonomous system are heated, if temperature rising of the electronic components and the battery is completed in the same way, the coolant is distributed and supplied to the part, which continuously requires temperature rising.

Because the battery 360 is large in specific heat but the computer, the lidar, the radar, and the sensor of the electronic components 110 are not large in specific heat, there are differences in flow rate and supply duration of coolant that the components demand, and the thermal management system according to the present invention can effectively perform thermal management through the third valve 370 and the coolant branch line 371.

In other words, if necessary, the thermal management system can supply coolant of the same low temperature to the battery 360 and the electronic components 110 at the same time. Moreover, if temperature rising is required, the thermal management system can supply coolant only to the battery 360, which requires temperature rising for a long time in order to prevent overheating and temperature rising of the electronic components 110 and to selectively raise temperature of only the battery 360.

As previously described, in the detailed description of the invention, having described the detailed exemplary embodiments of the invention, it should be apparent that modifications and variations can be made by persons skilled without deviating from the spirit or scope of the invention. Therefore, it is to be understood that the technical protective scope of the present invention should be defined by the technical idea of the attached claims.

The invention claimed is:

1. A thermal management system for a vehicle comprising a refrigerant cycle for carrying out air-conditioning of the interior of the vehicle, wherein a compressor for inhaling and compressing refrigerant and discharging the refrigerant in a gaseous state of high temperature and high pressure, a condenser for condensing the refrigerant by exchanging heat with the air, a first expansion valve for expanding the refrigerant, and an evaporator disposed inside an air-conditioning case to exchange heat between the refrigerant and the air discharged to the interior of the vehicle are disposed along a refrigerant line, which is a flow passage of the refrigerant; and wherein a cooling system of electronic components required for autonomous driving of the vehicle is connected to a first coolant line;

wherein the electronic components are located along the first coolant line, and wherein a chiller is located along the first coolant line and along a refrigerant branch line branching off from the refrigerant line for exchanging heat between coolant in the first coolant line and refrigerant in the refrigerant branch line;

wherein a coolant branch line is branched from the first coolant line at upstream and downstream sides of the electronic components such that the coolant branch line bypasses the electronic components, and wherein a battery is located along the coolant branch line;

wherein a heater for heating the coolant is provided along the first coolant line downstream of the chiller, and a branch point of the first coolant line and the coolant branch line is formed on the downstream side of the heater such that the heater is located between the chiller and the branch point, and wherein a first valve is located at the branch point for selectively flowing the coolant toward the electronic components along the first coolant line and the battery along the coolant branch line to selectively pass coolant heated by the heater to the electronic components and the battery.

2. The thermal management system according to claim 1, wherein the refrigerant branch line branches off from the refrigerant line at the upstream side of the first expansion valve and is connected to the refrigerant line at the downstream side of the evaporator, and a second expansion valve for expanding the refrigerant is disposed along the refrigerant branch line at the upstream side of the chiller so that the chiller is arranged in parallel with the evaporator.

3. The thermal management system according to claim 1, further comprising:

a second coolant line branching off from the first coolant line at the upstream side of the chiller and bypassing the chiller;

a low-temperature radiator disposed along the second coolant line to exchange heat between the coolant and the air; and a second valve for making the coolant selectively flow toward the chiller and the low-temperature radiator.

4. The thermal management system according to claim 3, wherein the low-temperature radiator is arranged side by side with the condenser at a front of the vehicle.

5. The thermal management system according to claim 3, further comprising:

a third coolant line branching off from the second coolant line at the downstream side of the low-temperature radiator and connected to the upstream side of the low-temperature radiator, wherein the third coolant line passes a vehicle power heat source part.

6. The thermal management system according to claim 5, further comprising:
   a third valve disposed at a branch point between the second coolant line and the third coolant line to make the coolant selectively flow toward the vehicle power heat source part and the first coolant line.

7. The thermal management system according to claim 1, further comprising:
   a coolant temperature sensor disposed along the first coolant line to sense temperature of the coolant, wherein the coolant temperature sensor is arranged at the upstream side of the electronic components.

8. The thermal management system according to claim 1, further comprising:
   a first water pump along the first coolant line and a second water pump disposed along the coolant branch line to circulate the coolant, wherein the first water pump is located upstream of and adjacent to the electronic components, and the second water pump is located upstream of and adjacent to the battery.

* * * * *